US009690789B2

(12) United States Patent
Dwivedi

(10) Patent No.: US 9,690,789 B2
(45) Date of Patent: Jun. 27, 2017

(54) ARCHIVE SYSTEMS AND METHODS

(75) Inventor: Alok Dwivedi, Reading (GB)

(73) Assignee: Veritas Technologies LLC, Mountain View, CA (US)

( * ) Notice: Subject to any disclaimer, the term of this patent is extended or adjusted under 35 U.S.C. 154(b) by 92 days.

(21) Appl. No.: 13/316,370

(22) Filed: Dec. 9, 2011

(65) Prior Publication Data
US 2013/0151801 A1    Jun. 13, 2013

(51) Int. Cl.
*G06F 13/00* (2006.01)
*G06F 17/30* (2006.01)

(52) U.S. Cl.
CPC .............................. *G06F 17/30073* (2013.01)

(58) Field of Classification Search
CPC combination set(s) only.
See application file for complete search history.

(56) References Cited

U.S. PATENT DOCUMENTS

| | | | |
|---|---|---|---|
| 7,366,718 B1* | 4/2008 | Pugh et al. | |
| 7,577,689 B1* | 8/2009 | Masinter et al. | |
| 2005/0251675 A1* | 11/2005 | Marcjan | G06F 21/6218 713/100 |
| 2008/0208933 A1* | 8/2008 | Lyon | G06F 11/1453 |
| 2008/0208963 A1* | 8/2008 | Eyal et al. | 709/203 |
| 2008/0243842 A1* | 10/2008 | Liang | G06F 17/30011 |
| 2008/0243914 A1* | 10/2008 | Prahlad et al. | 707/103 Y |
| 2009/0280824 A1* | 11/2009 | Rautiainen | G01S 5/14 455/456.1 |
| 2009/0327617 A1* | 12/2009 | Furuichi | G06F 21/6218 711/147 |
| 2010/0228933 A1* | 9/2010 | Braginsky | G06F 11/1458 711/162 |
| 2010/0268720 A1* | 10/2010 | Spivack | G06F 17/3087 707/756 |
| 2011/0069833 A1* | 3/2011 | Volkoff et al. | 380/28 |

(Continued)

OTHER PUBLICATIONS

No Author, "Single-Instance Storage," Wikipedia, the Free Encyclopedia, [retrieved Jan. 15, 2015], 3 pages, Internet: <http://en.wikipedia.org/wiki/Single-instance_storage>.

(Continued)

*Primary Examiner* — Charles Rones
*Assistant Examiner* — Han Doan
(74) *Attorney, Agent, or Firm* — Wilmer Cutler Pickering Hale and Dorr LLP

(57) ABSTRACT

Archive systems and methods are presented. In one embodiment, an archival information storage configuration method comprises: performing an information accessing process including determining if the information is associated with an archive process; and performing an archive storage boundary determination process including establishing archive storage boundaries based upon characteristics indicating potential sharing of the information and potential impacts on performance of archival storage operations. In one exemplary implementation, the archive storage boundary determination process comprises: performing an information mining process including identifying an indication the information is potentially shared; and performing an archival boundary selection process including selecting an archive storage boundary based in at least part upon results of the information mining process.

20 Claims, 10 Drawing Sheets

(56) References Cited

U.S. PATENT DOCUMENTS

| | | | | |
|---|---|---|---|---|
| 2011/0231424 A1* | 9/2011 | Avdanina | .......... | G06F 17/30176 707/769 |
| 2012/0173812 A1* | 7/2012 | Kidney et al. | ................ | 711/114 |

OTHER PUBLICATIONS

No Author, "Exchange Single-Instance Storage and its Effect on Stores when Moving Mailboxes," Microsoft Support, [retrieved Jan. 15, 2015], 2 pages, Internet: <http://support.microsoft.com/kb/175481>.

Ross Smith IV, "Dude, Where's My Single Instance?" The Exchange Team Blog, Feb. 22, 2010, 8 pages, Internet: <http://blogs.technet.com/b/exchange/archive/2010/02/22/3409361.aspx>.

Scott Lowe, "What can Windows Single Instance Storage do for You?" The Enterprise Cloud, Jan. 7, 2008, 7 pages, Internet: <http://www.techrepublic.com/blog/datacenter/what-can-windows-single-instance-storage-do-for-you/266>.

No Author, "Single Instance Storage (SIS)," Commvault Documentation, [retrieved Jan. 15, 2015], 5 pages, Internet: <http://documentation.commvault.com/commvault/release_7_0_0/books_online_1/english_us/features/single_instance/single_instance.htm>.

Jose Barreto, "The Basics of Single Instance Storage (SIS) in WSS 2003 R2 and WUDSS 2003," Jose Barreto's Blog, TechNet Blogs, Jan. 2, 2008, 6 pages, Internet: <http://blogs.technet.com/b/josebda/archive/2008/01/02/the-basics-of-single-instance-storage-sis-in-wss-200342-and-wudss-2003.aspx>.

No Author, Single Instance Storage, Technet Microsoft Forums, Aug. 21, 2008, 3 pages, Internet: <http://social.technet.microsoft.com/Forums/en-IE/configmgrgeneral/thread/0eb8b3c4-86c6-41c2-ae9e-b035d2ecae88>.

No Author, "Single Instance Storage (SIS)," Technet Microsoft, Sep. 29, 2010, 1 page, Internet: <http://technet.microsoft.com/en-us/library/gg232683(WS.10).aspx>.

No Author, "Getting Started With Storage Configuration Manager," IBM Knowledge Center, [retrieved Jan. 15, 2015], 2 pages, Internet: <http://publib.boulder.ibm.com/infocenter/director/v6r2x/index.jsp?topic=/com.ibm.storage.nssm.doc/scm_nssm_getting_started_with_scm.html>.

No Author, "Single Instance Storage—Configure," Commvault Documentation, [retrieved Jan. 15, 2015], 1 page, Internet: <http://documentation.commvault.com/commvault/release_7_0_0/books_online_1/english_us/features/single_instance/single_instance_configure.htm>.

No Author, "How Enterprise Vault Single Instance Storage Works," undated, 1 page.

No Author, "About Enterprise Vault Single Instance Storage," undated, 2 pages.

No Author, "About Single Instance Storage," undated, 2 pages.

No Author, Single Instance Storage Reduction by File Type Report, undated, 2 pages.

No Author, "WIM Format's Single-Instance Storage Q," Real Geek Forums, Oct. 11, 2006, 1 page, Internet: <http://www.realgeek.com/forums/wim-formats-single-instance-storage-q-164144.html>.

Domagoj Pernar, V-irtualization.com, DPM 2010 Step by Step Installation, [retrieved Jan. 16, 2015], 30 pages, Internet: <http://techycentral.com/wp-content/uploads/2010/09/dpm-2010-step-by-step-installation-by-v-irtualization-com.pdf>.

No Author, "Windows Home Server," Wikipedia, the Free Encyclopedia, [retrieved Jan. 16, 2015], 10 pages, Internet: <http://en.wikipedia.org/wiki/Windows_Home_Server>.

\* cited by examiner

200

---

210

Performing an information accessing process.

---

220

Performing an archive storage boundary determination process.

Performing an information mining process.

---

320

Performing an archive storage boundary selection process.

Selecting a preliminary first archive storage boundary based upon results of an information mining process.

---

420

Performing a sample duplication check on information within the preliminary first archive storage boundary selection.

---

430

Performing a comparison and the preliminary first archive storage boundary or the different second archive storage boundary is selected based upon the outcome of the comparing.

Receiving Information.

720

Performing a storage process, including archiving the information according to archive storage boundaries.

810
Information accessing module.

830
Archive storage boundary determination module.

821
Information mining module.

822
Archive storage boundary selection module.

FIG 8

ARCHIVE SYSTEMS AND METHODS

FIELD OF THE INVENTION

The present embodiments relate to the field of information archive storage. In one embodiment, archive storage boundaries are determined.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. These resources can include archival storage resources and archiving duplicate copies of information can consume or occupy large amounts of storage resources. Attempting to reduce duplicate copies can be complicated and complex.

Traditional attempts for finding duplicate copies involving comparing recently received or accessed information to previously archived information are often susceptible to inefficient performance and undesirable results. As many archival systems typically involve storage of vast amounts of information, conventional attempts to compare each piece of the numerous recently received information to the vast amount of previously archived information can result in long delays and excessive occupation of processing resources associated with archival activities. However, conventional attempts are reducing the amount of archived information that is checked for duplication against a piece of new information can also result excessive occupation of archival resources due to duplicate copies in unchecked archival information not being identified.

SUMMARY

Archive systems and methods are presented. In one embodiment, an archival information storage configuration method comprises: performing an information accessing process including determining if the information is associated with an archive process; and performing an archive storage boundary determination process including establishing archive storage boundaries based upon characteristics indicating potential sharing of the information and potential impacts on performance of archival storage operations. In one exemplary implementation, the archive storage boundary determination process comprises: performing an information mining process including identifying an indication the information is potentially shared; and performing an archival boundary selection process including selecting an archive storage boundary based in at least part upon results of the information mining process.

In one embodiment, an archive storage boundary selection is based upon a comparison of multiple potential archive storage boundaries indicated by the data mining process. In one exemplary implementation, the archive storage boundary determination process further comprises: selecting a preliminary first archive storage boundary based upon results of an information mining process; performing a sample duplication check on information within the preliminary first archive storage boundary selection; comparing the results of the sample duplication check on information within the preliminary first archival boundary to results of a different second duplication check on information within a different second archival boundary; and selecting either the preliminary first archival boundary or the different second archival boundary based upon outcome of the comparing. The storage boundary determination process can include pattern recognition. The pattern recognition can include data access patterns. The pattern recognition can be performed on a variety of levels (e.g., content source level, archived repository source level, etc.).

In one embodiment, a computer system comprises a processor coupled to a computer readable storage media and executing computer readable code which causes the computer system to perform operations including: performing an information accessing process including determining if the information is associated with an archive process; and performing an archive storage boundary determination process including establishing archive storage boundaries based upon characteristics indicating potential sharing of the information and potential impacts on performance of archival storage operations. In one exemplary implementation, the archive storage boundary determination process comprises: performing an information mining process including identifying an indication the information is potentially shared; and performing an archival boundary selection process including selecting an archive storage boundary based in at least part upon results of the information mining process.

In one embodiment, an archive storage boundary selection is based upon a comparison of multiple potential archive storage boundaries indicated by the data mining process. In one exemplary implementation, the archive storage boundary determination process further comprises: selecting a preliminary first archive storage boundary based upon results of an information mining process; performing a sample duplication check on information within the preliminary first archive storage boundary selection; comparing the results of the sample duplication check on information within the preliminary first archival boundary to results of a different second duplication check on information within a different second archival boundary; and selecting either the preliminary first archival boundary or the different second archival boundary based upon outcome of the comparing. The storage boundary determination process can include pattern recognition. The pattern recognition can include data access patterns. The pattern recognition can be performed on a variety of levels (e.g., content source level, archived repository source level, etc.).

In one embodiment, a reprogrammable tangible computer readable medium having stored thereon, computer executable instructions that when executed by a computer system cause the computer system to perform a method comprises: performing an information accessing process including determining if the information is associated with an archive process; and performing an archive storage boundary determination process including establishing archive storage boundaries based upon characteristics indicating potential sharing of the information and potential impacts on performance of archival storage operations. In one exemplary implementation, the archive storage boundary determination process comprises: performing an information mining process including identifying an indication the information is potentially shared; and performing an archival boundary selection process including selecting an archive storage boundary based in at least part upon results of the information mining process.

In one embodiment, an archive storage boundary selection is based upon a comparison of multiple potential archive storage boundaries indicated by the data mining process. In one exemplary implementation, the archive storage boundary determination process further comprises: selecting a preliminary first archive storage boundary based upon results of an information mining process; performing a sample duplication check on information within the preliminary first archive storage boundary selection; comparing the results of the sample duplication check on information within the preliminary first archival boundary to results of a different second duplication check on information within a different second archival boundary; and selecting either the preliminary first archival boundary or the different second archival boundary based upon outcome of the comparing. The storage boundary determination process can include pattern recognition. The pattern recognition can include data access patterns. The pattern recognition can be performed on a variety of levels (e.g., content source level, archived repository source level, etc.).

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 2 is a flow chart of an exemplary archival information storage configuration method in accordance with one embodiment of the present invention.

FIG. 3 is a flow chart of an exemplary storage boundary determination process in accordance with one embodiment of the present invention.

FIG. 4 is a block diagram of an exemplary archive storage boundary selection process in accordance with one embodiment of the present invention.

FIG. 7 is a flow chart of an exemplary archival storage process in accordance with one embodiment of the present invention.

FIG. 8 is a block diagram of exemplary an archival information storage configuration module which includes instructions for directing a processor in the performance of a cluster method in accordance with one embodiment of the present invention.

DETAILED DESCRIPTION

Figure 1:
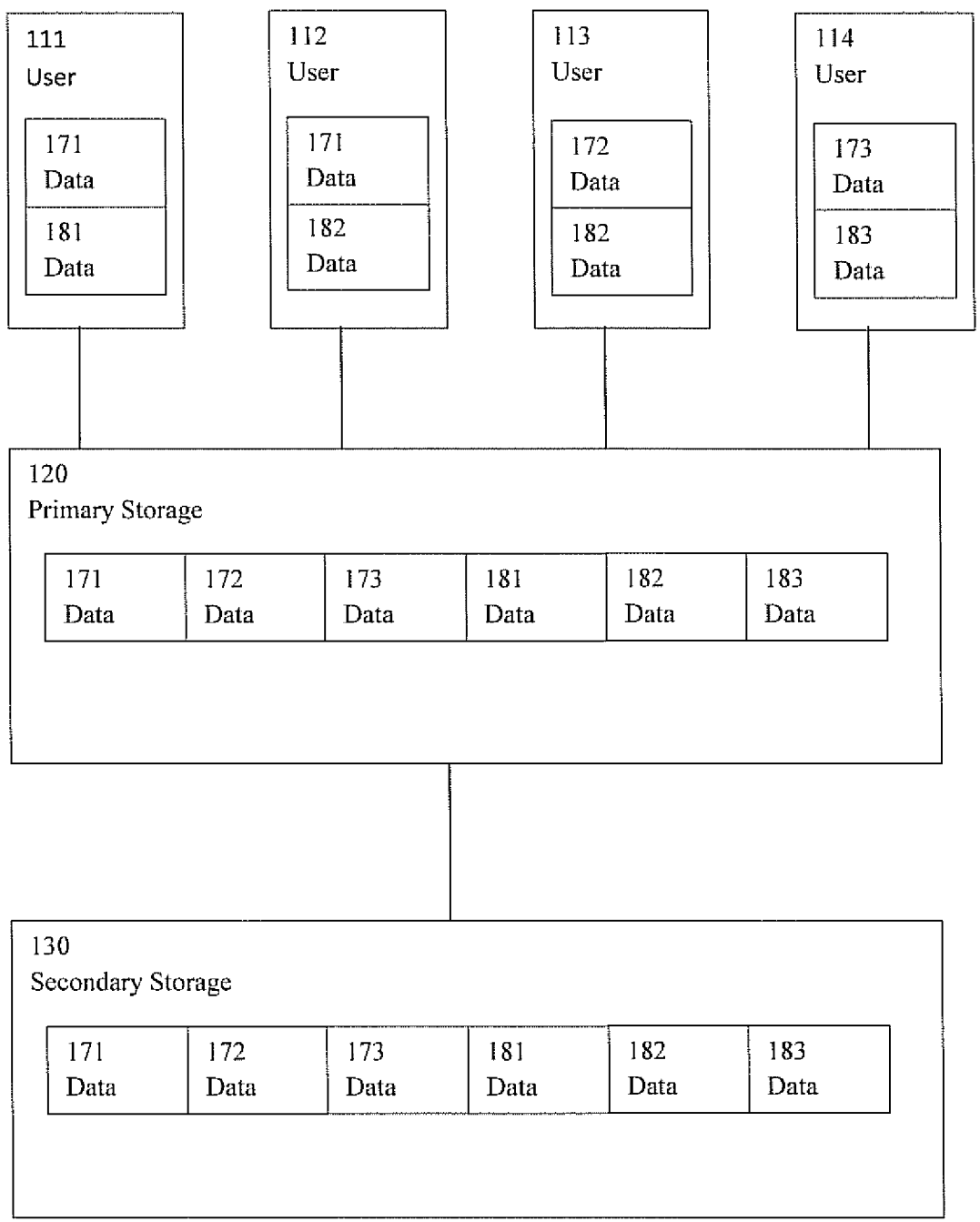
FIG. 1 is a block diagram of an exemplary archival storage system in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

The systems and methods described in the following sections of the detailed description can facilitate efficient and effective archive information storage. In one embodiment, an archive storage boundary is established. The archive storage boundary can be utilized to designate boundaries for archive duplication checking. The archive duplication checking can include comparing "newly" received information to previously archived information within an archive storage boundary to identify duplicates. The archive storage boundary can be a virtual boundary. In one exemplary implementation, single instance storage of information is implemented within an archive storage boundary. It is appreciated that there can be can one or more archive storage boundaries within an archive resource. It is also appreciated that there can be a variety of different archive storage boundary configurations and the archive storage boundaries can be defined in a variety of different ways.

An archive storage boundary can be defined by a storage region. An archive storage boundary can be defined by a characteristic associated with the information. In one embodiment, a characteristic associated with the information is a designation of entities (e.g., users, applications, etc.) that might potentially share (e.g., access, use, communicate, etc.) the information. In one exemplary implementation, the characteristic is associated with a group of users (e.g., users within a department of an organization, users on an email list, etc.) that might potentially share the information. As the group of users might potentially share the information, defining the archive storage boundary as including information from the group of users increases the likelihood of reducing duplicated archival storage of multiple instances of the information shared by each of the users when information from each of the users is archived. While the following detailed description often refers to archive sharing boundaries as the archive storage boundaries, it is appreciated that presented archive storage boundary establishment techniques can be implemented with a variety of archive storage boundaries.

In one embodiment, presented archive approaches allow administrators of archiving products to identify improved sharing configuration/topology that can give high levels of single instance storage with minimal or no impact to the archival rate. In one exemplary implementation, archive storage boundary identification involves use of data/pattern mining techniques. The data/pattern mining techniques can be implemented on either the source of the archived data or at metadata of the archived items.

FIG. 1 is a block diagram of archival storage system 100 in accordance with one embodiment of the present invention. Archival storage system 100 includes user 111, user 112, user 113, user 114, primary storage resource 120 and secondary storage resource 130. User 111, user 112, user 113, and user 114 are communicatively coupled to primary storage resource 120 which is communicatively coupled to secondary storage resource 130.

The components of archival storage system 100 cooperatively operate to share and archive information. User 111, user 112, user 113 and user 114 have access to at least some of the information stored on primary storage resource 120. In one embodiment, the access rights of users 111, 112, 113 and 114 to information stored on primary storage resource 120 varies. In one exemplary implementation, user 111 has access to data 171 and data 181, user 112 has access to data 171 and data 182, user 113 has access to data 172 and data 182 and user 114 has access to data 173 and data 183. Even though users 111 and 112 have shared access to data 171 and users 112 and 113 have shared access to data 182 a single instance of the data 171 and 182 is stored on primary storage resource 120. A single instance of data 171 and 182 is also stored on secondary storage resource 130.

It is appreciated components of archival storage system 100 can be included in a network. In one embodiment, primary storage resource 120 and secondary storage resource 130 each respectively include one or more servers and each user 111, 112 113 and 114 can include independent client resources (e.g., personal computer, etc.). It is appreciated that while primary storage 120 is designated as the primary storage resource, resources associated with each of the users 111, 112, 113 and 114 can also include storage capabilities (e.g., personal computer, etc.) that also store instances of information stored on primary storage resource 120.

It is appreciated that archive storage boundaries for performing single instance storing operations can be established for information in archival storage resource 130. In one embodiment, the archive storage boundaries are utilized as duplicative checking boundaries. In one exemplary implementation, duplicative checking operations are directed to information within the archival storing boundaries. In one embodiment, the archive storing boundaries are established to include information that can be shared. In one exemplary implementation, data 171, data 172, data 181 and data 182 are included in an archival sharing boundary based on users 111, 112 and 113 using this data and sharing access to data 171 and 182.

FIG. 2 is a flow chart of an archival information storage configuration method 200 in accordance with one embodiment of the present invention.

In block 210, an information accessing process is performed. In one embodiment, the information accessing process includes accessing the information and determining if the information is associated with an archive process. It is appreciated that the information accessing can be performed on a variety of levels (e.g., content source level, archive level, etc.). In one exemplary implementation, information is accessed from a content source (e.g., a MS Exchange Server, a File Server, a Share Point server, etc.). In one exemplary implementation, information is accessed from an archive repository and includes metadata (e.g., indication of a user associated with the information, indication of a content source associated with the information, etc.).

In block 220, an archive storage boundary determination process is performed. In one embodiment, the archive storage boundary determination process includes examining the information accessed in block 210 and establishing archive storage boundaries. In one exemplary implementation, the archive storage boundaries are established based upon characteristics indicating potential sharing of the information and potential impacts on performance of archival storage operations. Additional information regarding archive storage boundary determination processes is presented in following sections of the detailed description.

FIG. 3 is a flow chart of storage boundary determination process 300 in accordance with one embodiment of the present invention. In one embodiment, storage boundary determination process 300 is similar to storage boundary determination process performed in block 220.

In block 310, an information mining process is performed. In one embodiment, the information mining process includes identifying an indication the information is potentially shared. The indication can include a characteristic associated with the information (e.g., a user has access to the information, an application uses the information, etc.). The information mining can be performed on a content source level. The information mining can be performed on an archived repository source level. In one embodiment, the information mining process includes an analysis of the information. The analysis can include pattern recognition. In one exemplary implementation, the pattern recognition includes recognizing data access patterns. In one exemplary implementation, the pattern recognition includes recognizing data access and use patterns. It is appreciated that a variety of different analysis techniques (e.g., clustering based, distribution based, density based, etc.) can be performed during the mining process.

In block 320, an archive storage boundary selection process is performed. In one embodiment, the archive storage boundary selection process includes selecting an archive storage boundary based in at least part upon results of the information mining process. In one embodiment, the archive storage boundary selection process can also include selecting an archive storage boundary based in at least part upon impacts to archive operations. A threshold or limit can be placed on the archive storage boundary regardless of the results of the data mining. In one exemplary implementation, a limit is placed on the number of users (e.g., 10,000, 250,000, etc.) that are associated with an archive storage boundary so that archive processing is not excessively delayed searching large amounts of information associated with the numerous users for duplicates.

It is appreciated that an archive storage boundary selection can also be based upon a comparison of multiple potential archive storage boundaries indicated by the data mining process. FIG. 4 is a block diagram of archive storage boundary selection process 400 in accordance with one embodiment of the present invention. In one embodiment, archive storage boundary selection process 400 is similar to the archive storage boundary selection process of block 320.

In block 410, a preliminary first archive storage boundary selection is based upon results of an information mining process. In one exemplary implementation, results of the information mining process includes indications of potential sharing of information. The data mining process can include analysis of patterns of data access and use.

In block 420, a sample duplication check is performed on information within the preliminary first archive storage boundary selection. In one embodiment, a first portion of information from within the first archive storage boundary is compared to a second portion of information from within the first archive storage boundary to determine if the first portion and second portion are duplicates or copies.

In block 430, a comparison is performed. In one embodiment, the results of the sample duplication check on information within the preliminary first archive storage boundary are compared to results of a different second duplication check on information within a different second archive storage boundary. Either the preliminary first archive storage boundary or the different second archive storage boundary is selected based upon the outcome of the comparing. It is appreciated the operations of archive storage boundary selection process 400 can be iteratively performed with comparison of multiple different archive storage boundaries and selection of an archive storage boundary based upon the results of the comparison.

Figure 5:
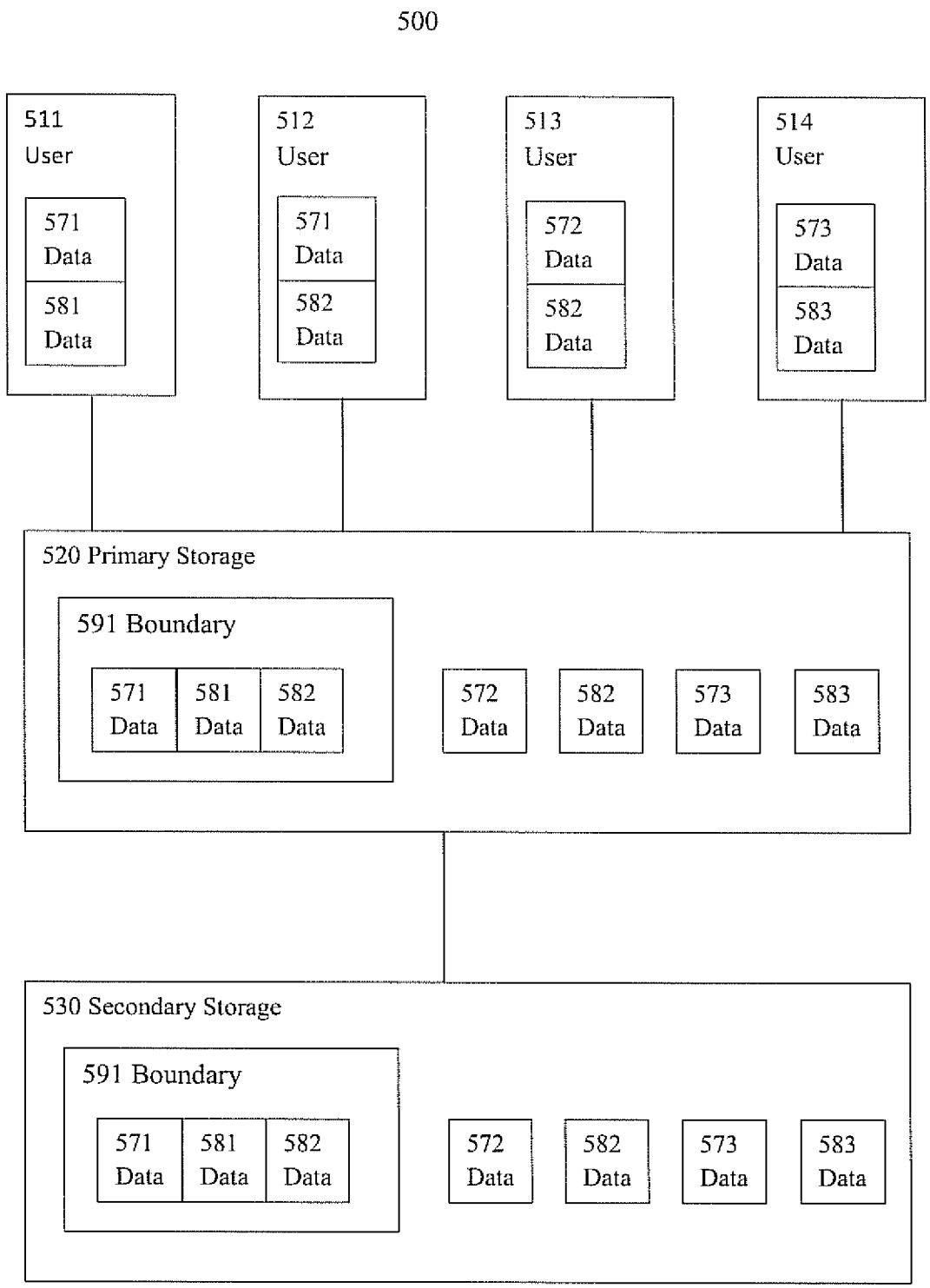
FIG. 5 is a block diagram of an exemplary archival storage system in accordance with one embodiment of the present invention.

FIG. 5 is a block diagram of archival storage system 500 in accordance with one embodiment of the present invention. Archival storage system 500 is similar to archival storage system 100. Archival storage system 500 includes user 511, user 512, user 513, user 514, primary storage resource 520 and secondary storage resource 530. User 511, user 512, user 513, and user 514 are communicatively coupled to primary storage resource 520 which is communicatively coupled to secondary storage resource 530.

The components of archival storage system 500 cooperatively operate to share and archive information. Users 511, 512, 513 and 514 have access to at least some of the information stored on primary storage resource 520. In one embodiment, an archival information storage configuration method (e.g., similar to method 200, etc.) establishes an archive storage boundary 591 based upon information associated with users 511 and 512 since users 511 and 512 having sharing or having access to data 571. A single instance of the data 571 is stored on primary storage resource 520 and a single instance of data 571 is also stored on secondary storage resource 530.

Figure 6:
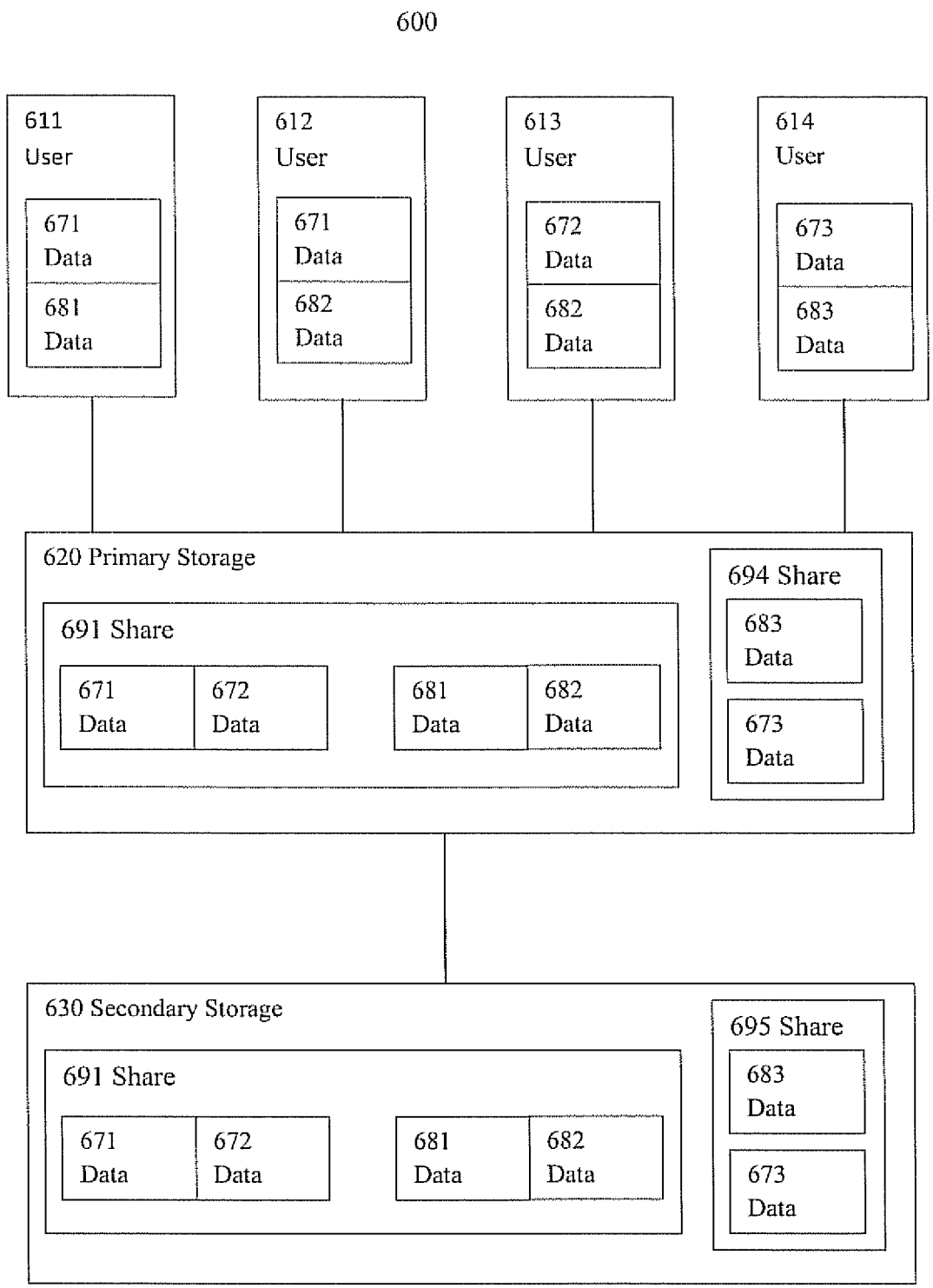
FIG. 6 is a block diagram of another exemplary archival storage system in accordance with one embodiment of the present invention.

FIG. 6 is a block diagram of archival storage system 600 in accordance with one embodiment of the present invention. Archival storage system 600 is similar to archival storage system 100. Archival storage system 600 includes user 611, user 612, user 613, user 614, primary storage resource 620 and secondary storage resource 530. User 611, user 612, user 613, and user 614 are communicatively coupled to primary storage resource 620 which is communicatively coupled to secondary storage resource 630.

The components of archival storage system 600 cooperatively operate to share and archive information. Users 611, 612, 613 and 614 have access to at least some of the information stored on primary storage resource 620. In one embodiment, an archival information storage configuration method (e.g., similar to method 200, etc.) establishes an archive storage boundary 691 based upon information associated with users 611, 612 and 613 since users 611 and 612 share or have access to data 671 and users 612 and 613 share or have access to data 682. A single instance of the data 671 and a single instance of data 682 is stored on primary storage resource 620 and a single instance of data 671 and a single instance of data 682 is also stored on secondary storage resource 630.

As indicated above, information mining and pattern recognition algorithms can be run in a variety of levels (e.g. archived repository information, content source information, etc.). In one embodiment, information mining and pattern recognition is performed on destination metadata generated for actual archived items. In one exemplary implementation, an enterprise archive vault maintains a SQL metadata for archived items. Part of this metadata (e.g., fingerprint database, etc.) is used to store fingerprints (e.g., Hash Parts, etc.) of the archived items which are referenced at the time of archiving new items to determine potential sharers. In one exemplary implementation, each vault store group (e.g., virtual containers of archived entities, etc.) has one logical fingerprint database. In one embodiment, data mining and pattern searching algorithms can be run across the fingerprint databases as if there was one huge global fingerprint database for the entire archive repository.

In one embodiment, the information mining is performed on the content source data (e.g. content data from a MS Exchange Server source, content data from a File server source, content data from a Share Point server source, etc.). Running data/pattern mining algorithms on the content sources can be used to highlight some useful insight regarding how digital information flows and is potentially shared within an organization. In one exemplary implementation, the analysis results include indications of which users or groups of users (e.g., organization department, users on e-mail list, etc.) exchange more emails with each other and where the documents used as attachments to various emails are stored so that information from both type of content sources (e.g., corresponding e-mail exchange servers and corresponding share point servers, etc.) can be combined under one archive sharing boundary.

It is appreciated that a variety of different techniques can use destination metadata to discover better archive storage boundaries. In one embodiment, there is a fingerprint database to store a fingerprint (e.g., hash parts, etc.) of sharable archived entities. In one exemplary implementation, an archive storage boundary configuration "discovery" task can be used to perform a detailed analysis of various fingerprint databases in an archive installation. This task can be scheduled to run various forms of pattern mining queries on fingerprint databases. These pattern mining queries can be applied to a sample of data from the various fingerprint databases. Sample data can be then be queried to discover following information. A variety of different queries can be implemented In one embodiment, the query includes checking if sharable entities in a first fingerprint database can also be shared with a second fingerprint database that is currently outside the archive sharing boundary. If more sharing can be achieved outside the first fingerprint database, then an additional check is performed to determine what sources are involved in the archived items and a test on archived items from these sources is performed with a larger sample data.

In one embodiment, the query can be directed to determining different various permutations of archive storage boundaries. The query can also be directed to discovering which archive storage boundary permutation or configuration generates more efficient single instance storage with reduction duplicate of information.

In one embodiment, the query can be directed to finding out vault store groups getting low single instance storage (SIS) and check if the percentage SIS can be improved by splitting large vault store groups in to more than one smaller groups. The task can also be used to export a fingerprint database to an "analytical database". In one exemplary, the analytical database includes MS SQL Analysis services. Then various OLAP cubes can be created to discover different types of patterns mentioned above. In one embodiment, this information can be presented to an administrator to help decide how to reconfigure an existing archive system and archive storage boundaries to achieve better SIS.

It is appreciated that a variety of different techniques can use content source data to discover better archive storage boundaries. In one embodiment, a selection of sample of users that send emails with large size attachments to large distribution lists and emails sent by the users during certain period of time (again as a sample of certain days in a month or year) are analyzed for indications of duplication.

In one embodiment, e-mails are analyzed for common patterns in recipients. In one exemplary implementation, if the same set of recipients occur in certain percentage of email communications then the recipients are included in users that can be covered by or define the archive storage boundaries.

In one embodiment, patterns of data/information flow within organization are examined or analyzed. A check what various data information sources are can be performed and how they might be related can be examined. In one exemplary implementation, certain users may be using some specific network shares to upload documents for their email attachments and file system archives (FSA) sources on those network shares can be combined with email archives (mailbox archives) for those users to achieve more efficient SIS.

In one embodiment, using above patterns clustering techniques can be applied to create clusters of users and various archive sources, which if targeted using one SIS boundary can produce more SIS. This will help to keep SIS boundaries small so that performance of initial lookup to find sharers at archive time is not impacted but at the same time produce more SIS.

FIG. 7 is a flow chart of archival storage process 700 in accordance with one embodiment of the present invention.

In block 710, information is received. In one embodiment, the information is received by a file system. Information can come from a variety of sources. In one embodiment, the sources include users. In one exemplary implementation, the sources include applications.

In block 720, a storage process is performed. In one embodiment, the storage process includes archiving the information according to archive storage boundaries. In one exemplary implementation, a duplication check is performed to determine if the information is a duplicate of previously archived information. In one embodiment, metadata is utilized to indicate multiple sources have access to or share the single instance of the archived information.

FIG. 8 is a block diagram of exemplary archival information storage configuration module 800 which includes instructions for directing a processor in the performance of a cluster method in accordance with one embodiment of the present invention. In one embodiment, exemplary archival information storage configuration method 800 includes instructions for directing a processor in the performance of an archival information storage configuration method (e.g., 200, 300 etc.). Archival information storage configuration module 800 includes information accessing module 810 and archive storage boundary determination module 820. In one embodiment, archival storage boundary determination module 820 includes information mining module 821 and archive storage boundary selection module 822.

Information accessing module 810 includes instructions for performing an information accessing process. In one embodiment, information accessing module 810 includes instructions for performing an information accessing process as indicated in block 210. Archive storage boundary determination module 820 includes instructions for performing an archive storage boundary determination process. In one embodiment, archive storage boundary determination module 820 includes instructions for performing an archive storage boundary determination process as indicated in block 220. Information mining module 821 includes instructions for performing an information mining process. In one embodiment, information mining module 821 includes instructions for performing an information mining process as indicated in block 310. Archive storage boundary selection module 822 includes instructions for performing an archive storage boundary selection process. In one embodiment, archive storage boundary selection module 822 includes instructions for performing an archive storage boundary selection process as indicated in block 320.

Figure 9:
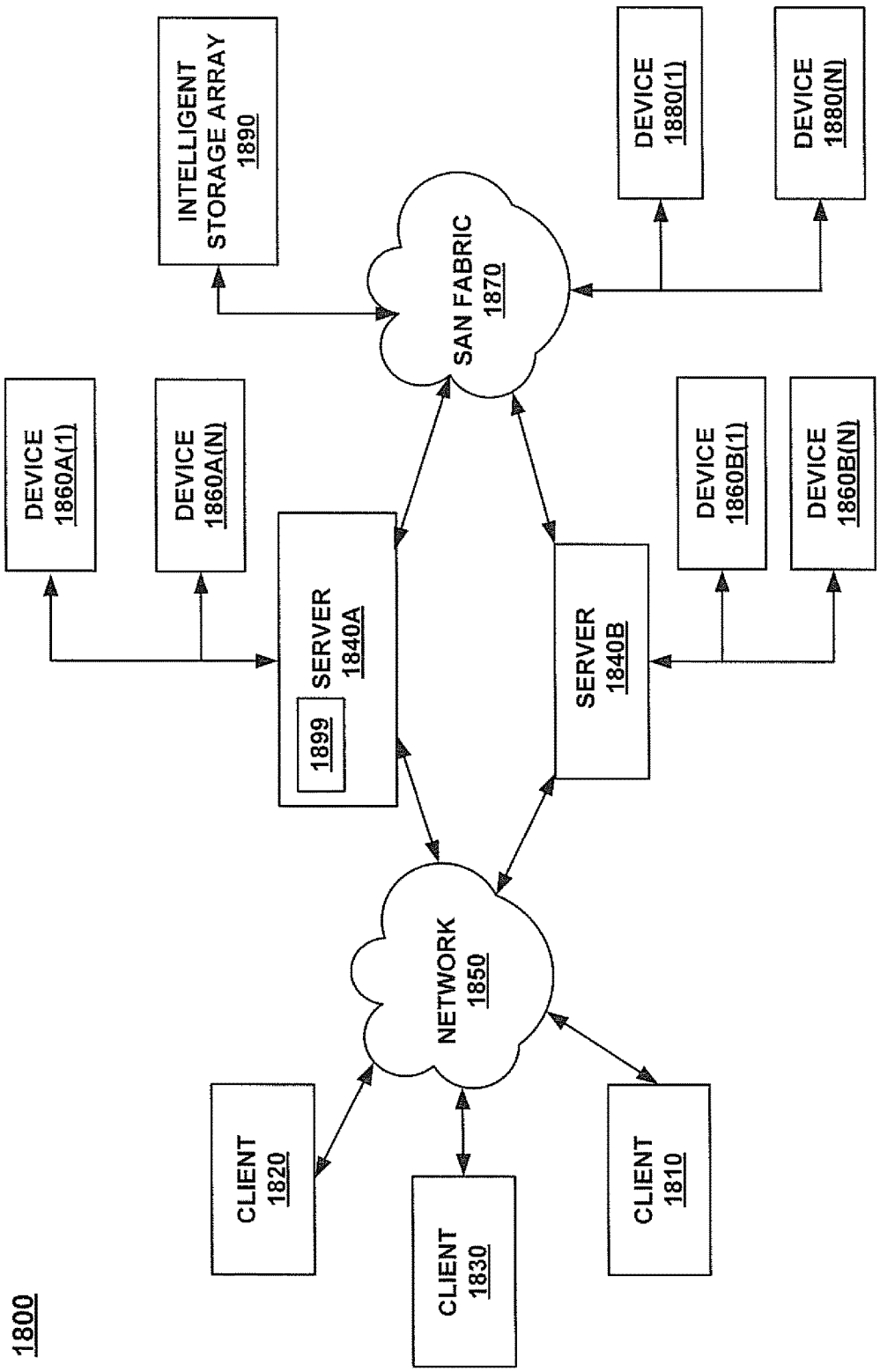
FIG. 9 is a block diagram depicting an exemplary network architecture in which client systems as well as storage servers, are coupled to a network in accordance with one embodiment of the present invention.

It is appreciated present cluster systems and methods can be implemented as part of a variety of environments. For example, archive systems and methods can be implemented as part of a distributed computing environment, a cloud computing environment, a virtual environment, a client server environment, etc. In one embodiment, an archival information storage configuration method (e.g., method 200, 300, etc.) can be implemented on a network. FIG. 9 is a block diagram depicting an exemplary network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and also by client systems 1810, 1820 and 1830 via network 1850. Intelligent storage array 1890 is also shown as an example of a specific storage device accessible via SAN fabric 1870. In one embodiment, server 1840A includes archival information storage configuration module 1899. In one embodiment, archival information storage configuration module 1899 is similar to variable archival information storage configuration module 800. It is appreciated that present systems and methods are compatible with a variety of implementations. For example, portions of information and instructions associated with can be distributed in various resources.

Figure 10:
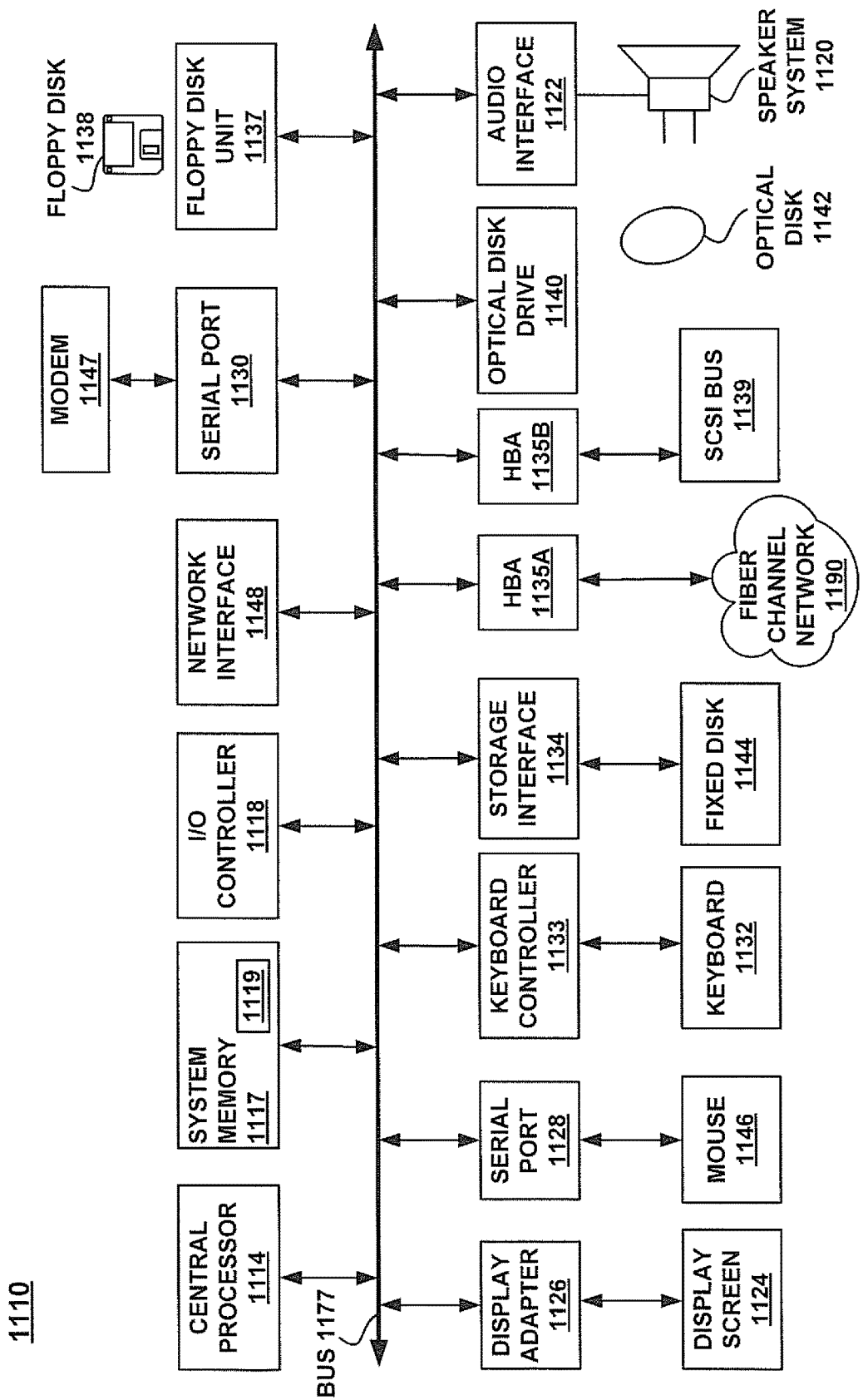
FIG. 10 depicts a block diagram of an exemplary computer system suitable for implementing the present methods in accordance with one embodiment of the present invention.

FIG. 10 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing an archival information storage configuration method (e.g., similar to method 200, 300, etc.) are stored in one or more memories of computer system 1100 (e.g., in memory location 1119). The RAM is generally the main memory into which the operating system and application programs are loaded. In one embodiment, RAM 1117 includes a archival information storage configuration module (e.g., in memory location 1119). In one embodiment, a archival information storage configuration module stored in memory location 1119 is similar to archival information storage configuration module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 9 depicts the use of a network such as the Internet for exchanging data, but the present disclosure is not limited to the Internet or any particular network-based environment.

Thus, the presented systems and methods described above can facilitate efficient and effective archive storage boundary configuration. In one embodiment, relatively high levels of sharing and single instance storage can be achieved without excessive impacts to archive operations. In one embodiment, archive storage boundary determination is simplified and automated. In one exemplary implementation, an archive storage boundary can be suggested to users for approval. The archive storage boundaries can facilitate improved single instance storage rates and reduce performance bottleneck impacts. In one embodiment, the archive storage boundaries can be configured to facilitate improved inclusion of shared information while keeping boundaries within acceptable ranges so that checks for duplication of information do not excessively affect archival performance.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A method comprising:
    identifying information that is associated with an archive process;
    evaluating the information on at least one of a content source level or an archived repository source level to determine that the information is shared by at least one group of users or applications;
    determining an archive storage boundary for archive duplication checking, the determining being based at least in part upon the determination that the information is shared by the at least one group of users or applications, wherein a limit is placed on a number of users or applications allowed in the at least one group such that the archive process is not excessively delayed for searching duplicative information shared by the at least one group of users or applications; and
    determining, after determining the archive storage boundary, that the information is duplicate information based on the archive duplication checking using the archive storage boundary.

2. The method of claim 1, wherein determining the archive storage boundary is further based at least in part upon a comparison of a plurality of potential archive storage boundaries, wherein the archive storage boundary is selected from the plurality of potential archive storage boundaries.

3. The method of claim 1, wherein determining the archive storage boundary comprises:
    selecting a preliminary first archive storage boundary;
    performing a sample duplication check on information within the preliminary first archive storage boundary;
    comparing a result of performing the sample duplication check on information within the preliminary first archive storage boundary to a result of a sample duplication check on information within a second archive storage boundary; and
    selecting the preliminary first archive storage boundary or the second archive storage boundary based upon a result of the comparing.

4. The method of claim 1 wherein, the determining the archive storage boundary comprises pattern recognition.

5. The method of claim 4, wherein the pattern recognition comprises using data access patterns.

6. The method of claim 4, wherein the pattern recognition is performed on a content source level.

7. The method of claim 4, wherein the pattern recognition is performed on an archived repository source level.

8. A non-transitory tangible computer readable medium having stored thereon, computer executable instructions that when executed by a processor cause the processor to perform operations comprising:
    identifying, by the processor, information that is associated with an archive process;
    evaluating the information on at least one of a content source level or an archived repository source level to determine that the information is shared by at least one group of users or applications;
    determining an archive storage boundary for archive duplication checking, the determining being based at least in part upon the determination that the information is shared by the at least one group of users or applications, wherein a limit is placed on a number of users or applications allowed in the at least one group such that the archive process is not excessively delayed for searching duplicative information shared by the at least one group of users or applications; and
    determining, after determining the archive storage boundary, that the information is duplicate information based on the archive duplication checking using the archive storage boundary.

9. The non-transitory tangible computer readable medium of claim 8, wherein determining the archive storage boundary is further based at least in part upon a comparison of a plurality of potential archive storage boundaries, wherein the archive storage boundary is selected from the plurality of potential archive storage boundaries.

10. The non-transitory tangible computer readable medium of claim 8, wherein determining the archive storage boundary comprises:
    selecting a preliminary first archive storage boundary;
    performing a sample duplication check on information within the preliminary first archive storage boundary;
    comparing a result of performing the sample duplication check on information within the preliminary first archive storage boundary to result of a sample duplication check on information within a second archive storage boundary; and selecting the preliminary first archive storage boundary or the second archive storage boundary based upon a result of the comparing.

11. The non-transitory tangible computer readable medium of claim 8, wherein determining the archive storage boundary comprises pattern recognition.

12. The non-transitory tangible computer readable medium of claim 11, wherein the pattern recognition comprises using data access patterns.

13. The non-transitory tangible computer readable medium of claim 11, wherein the pattern recognition is performed on a content source level.

14. The non-transitory tangible computer readable medium of claim 11, wherein the pattern recognition is performed on an archived repository source level.

15. A computer system comprising:

a processor coupled to a non-transitory computer readable storage media and executing computer readable code which causes the processor to perform operations comprising:

identifying information that is associated with an archive process;

evaluating the information on at least one of a content source level or an archived repository source level to determine that the information is shared by at least one group of users or applications;

determining an archive storage boundary for archive duplication checking, the determining being based at least in part upon the determination that the information is shared by the at least one group of users or applications, wherein a limit is placed on a number of users or applications allowed in the at least one group such that the archive process is not excessively delayed for searching duplicative information shared by the at least one group of users or applications; and determining, after determining the archive storage boundary, that the information is duplicate information based on the archive duplication checking using the archive storage boundary.

16. The computer system of claim 15, wherein determining the archive storage boundary is further based at least in part upon a comparison of a plurality of potential archive storage boundaries, wherein the archive storage boundary is selected from the plurality of potential archive storage boundaries.

17. The computer system of claim 15, wherein determining the archive storage boundary comprises:

selecting a preliminary first archive storage boundary;

performing a sample duplication check on information within the preliminary first archive storage boundary;

comparing a result of performing the sample duplication check on information within the preliminary first archive storage boundary to a result of a sample duplication check on information within a second archive storage boundary; and selecting the preliminary first archive storage boundary or the second archive boundary based upon a result of the comparing.

18. The computer system of claim 15, wherein determining the archive storage boundary comprises pattern recognition.

19. The computer system of claim 18, wherein the pattern recognition comprises using data access patterns.

20. The computer system of claim 18, wherein the pattern recognition is performed on an archived repository source level.

* * * * *